US011537467B2

(12) United States Patent
Jang et al.

(10) Patent No.: US 11,537,467 B2
(45) Date of Patent: Dec. 27, 2022

(54) MEMORY, MEMORY SYSTEM, AND OPERATION METHOD OF MEMORY

(71) Applicant: SK hynix Inc., Gyeonggi-do (KR)

(72) Inventors: Munseon Jang, San Jose, CA (US); Hoiju Chung, San Jose, CA (US)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/354,355

(22) Filed: Jun. 22, 2021

(65) Prior Publication Data
US 2021/0397513 A1 Dec. 23, 2021

Related U.S. Application Data

(60) Provisional application No. 63/042,215, filed on Jun. 22, 2020, provisional application No. 63/164,809, filed on Mar. 23, 2021.

(51) Int. Cl.
*G06F 11/00* (2006.01)
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0655* (2013.01); *G06F 3/0679* (2013.01)

(58) Field of Classification Search
None
See application file for complete search history.

(56) References Cited

U.S. PATENT DOCUMENTS

| 11,322,219 | B2* | 5/2022 | Chung | G11C 29/44 |
| 2009/0158122 | A1 | 6/2009 | Gagnon | |
| 2016/0041875 | A1* | 2/2016 | Kanno | H03M 13/6561 |
| | | | | 714/764 |
| 2016/0055052 | A1* | 2/2016 | Hu | G06F 11/10 |
| | | | | 714/799 |

(Continued)

FOREIGN PATENT DOCUMENTS

KR 10-2017-0128057 11/2017

OTHER PUBLICATIONS

X. Zhang, E. Wang, D. Zhang, Y. Wang, W. Wu and X. Dong, "Software-Based Detecting and Recovering from ECC-Memory Faults," 2011 Third International Conference on Intelligent Networking and Collaborative Systems, 2011, pp. 715-719, doi: 10.1109/INCoS.2011.148. (Year: 2011).*

(Continued)

*Primary Examiner* — Daniel F. McMahon
(74) *Attorney, Agent, or Firm* — IP & T Group LLP

(57) ABSTRACT

A memory which includes a downlink error correction circuit suitable for correcting an error in data transferred from a memory controller based on a downlink error correction code transferred from the memory controller to produce an error-corrected data so that when an uncorrectable error is detected in the downlink error correction circuit of the memory or when an uncorrectable error is detected in the memory error correction circuit of the memory, the information that there is an uncorrectable error may be transferred to the memory controller in the memory system by using an uncorrectable error signal and an error flag signal, thus, improving the reliability of the memory system.

12 Claims, 3 Drawing Sheets

(56) References Cited

U.S. PATENT DOCUMENTS

| | | | |
|---|---|---|---|
| 2016/0055059 A1* | 2/2016 | Hu | G06F 11/1008 |
| | | | 714/764 |
| 2016/0277148 A1* | 9/2016 | Heinle | H04L 1/1874 |
| 2018/0129565 A1* | 5/2018 | Lee | H03M 13/2906 |
| 2019/0354435 A1* | 11/2019 | Chung | G06F 3/0673 |
| 2020/0004627 A1* | 1/2020 | Sharon | G06F 3/064 |
| 2020/0201709 A1* | 6/2020 | Song | G06F 11/1068 |

OTHER PUBLICATIONS

M. Nicolaidis, T. Bonnoit and N.-E. Zergainoh, "Eliminating speed penalty in ECC protected memories," 2011 Design, Automation & Test in Europe, 2011, pp. 1-6, doi: 10.1109/DATE.2011.5763256. (Year: 2011).*

* cited by examiner

MEMORY, MEMORY SYSTEM, AND OPERATION METHOD OF MEMORY

CROSS-REFERENCE TO RELATED APPLICATIONS

The present application claims priority of U.S. Provisional Application No. 63/042,215 filed on Jun. 22, 2020 and U.S. Provisional Application No. 63/164,809 filed on Mar. 23, 2021, which are incorporated herein by reference in its entirety.

BACKGROUND

1. Field

Various embodiments of the present invention relate to a memory and a memory system.

2. Description of the Related Art in the early stages of the semiconductor memory device industry, there were many originally good dies on the wafers, which means that memory chips were produced with no defective memory cells through a semiconductor fabrication process. However, as the capacity of memory devices increases, it becomes difficult to fabricate a memory device that does not have any defective memory cells, and nowadays, it may be said that there is substantially no chance that a memory device is fabricated without any defective memory cells. To address the problem, a repair method of including redundant memory cells in a memory device and replacing defective memory cells with the redundant memory cells is being used.

As another method, an error correction circuit (ECC circuit) for correcting errors in a memory system is used to correct errors occurring in memory cells and errors occurring when data are transferred during a read operation and a write operation of the memory system.

SUMMARY

Embodiments of the present invention are directed to a method of detecting an uncorrectable error in a memory and notifying a memory controller of the uncorrectable error.

In accordance with an embodiment of the present invention, a memory includes: a downlink error correction circuit suitable for correcting an error in data transferred from a memory controller based on a downlink error correction code transferred from the memory controller to produce an error-corrected data; a memory error correction code generation circuit suitable for generating a memory error correction code based on the error-corrected data obtained by the downlink error correction circuit; an error injection circuit suitable for injecting an error into at least one among the error-corrected data obtained by the downlink error correction circuit and the memory error correction code when an uncorrected error in the data transferred from the memory controller is detected by the downlink error correction circuit; and a memory core suitable for storing the data and the memory error correction code transferred from the error injection circuit.

In accordance with another embodiment of the present invention, a memory system includes: a memory controller which comprises: a downlink error correction code generation circuit suitable for generating a downlink error correction code based on data to be transferred to a memory; and the memory which comprises: a downlink error correction circuit suitable for correcting an error in data transferred from the memory controller based on the downlink error correction code transferred from the memory controller to produce an error-corrected data; a memory error correction code generation circuit suitable for generating a memory error correction code based on the error-corrected data obtained by the downlink error correction circuit; an error injection circuit suitable for injecting an error into at least one among the error-corrected data obtained by the downlink error correction circuit and the memory error correction code when an uncorrectable error in the data transferred from the memory controller is detected by the downlink error correction circuit; and a memory core suitable for storing the error-corrected data and the memory error correction code transferred from the error injection circuit.

In accordance with yet another embodiment of the present invention, a method for operating a memory includes: receiving data and a downlink error correction code; performing a first error correction operation for correcting an error of the data based on the downlink error correction code to produce an error-corrected data; detecting an uncorrectable error in the data through the first error correction operation; generating a memory error correction code based on the error corrected data; injecting an error into at least one among the error-corrected data and the memory error correction code in response to the detection of the uncorrectable error and transferring the data and the memory error correction code to a memory core after the injecting; and writing the data and the memory error correction code transferred to the memory core into the memory core.

In accordance with still another embodiment of the present invention, a method for operating a memory system includes: generating a first error-correction code based on first data; performing a first error-correction operation on the first data, which experiences a medium, based on the first error-correction code to generate second data; generating a second error-correction code based on the second data; injecting, when the second data includes an original error that is not corrected through the first error-correction operation, an intentional error into at least one of the second data and the second error-correction code; and storing, into a memory core, the second data and the second error-correction code.

DETAILED DESCRIPTION

Figure 1:
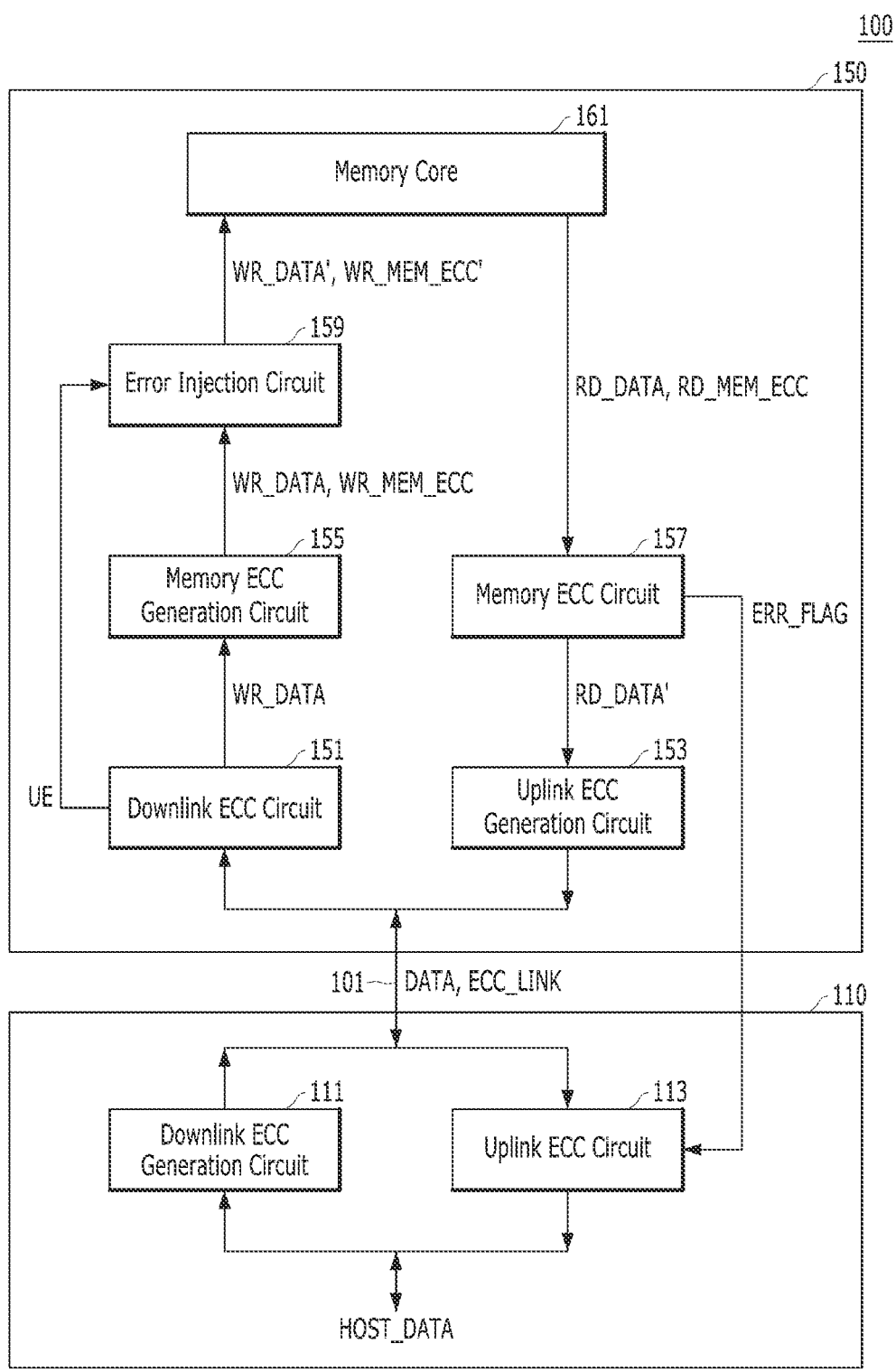
FIG. 1 is a block diagram illustrating a memory system 100 according to an embodiment of the present invention.

Various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

FIG. 1 is a block diagram illustrating a memory system 100 according to an embodiment of the present invention. In FIG. 1, only the portion directly related to data transfer and error correction in the memory system 100 are illustrated.

Referring to FIG. 1, the memory system 100 may include a memory controller 110 and a memory 150.

The memory controller 110 may control the operations of the memory 150, such as a read operation and a write operation, according to a request from a host. The host may include a Central Processing Unit (CPU), a Graphic Processing Unit (GPU), an Application Processor (AP), and the like, and the memory controller 110 may be included inside or outside the host. When the memory controller 110 is included inside the host, host data HOST_DATA in the figure may represent data that are exchanged between the memory controller 110 of the host and the other constituent elements of the host in the inside of the host. When the memory controller 110 exists outside the host, the host data HOST_DATA in the figure may represent the data that the memory controller 110 exchanges with the host. The host data HOST_DATA may be multi-bit data.

The memory controller 110 may include a downlink error correction code generation circuit 111 and an uplink error correction circuit 113, The downlink error correction code generation circuit 111 and the uplink error correction circuit 113 may be circuits for dealing with an error that may occur in a process of transferring data DATA between the memory controller 110 and the memory 150.

The downlink error correction code generation circuit 111 may generate a downlink error correction code ECC_LINK for correcting an error of the data DATA by encoding host data HOST_DATA during a write operation. The downlink error correction code ECC_LINK may be an error correction code for correcting an error that may occur over a channel 101 through which the data DATA are transferred. The link error correction code ECC_LINK transferred from the memory controller 110 to the memory 150 over the channel 101 may be referred to as a downlink error correction code, and the link error correction code ECC_LINK transferred from the memory 150 to the memory controller 110 may be referred to as an uplink error correction code. During a write operation, the downlink error correction code generation circuit 111 may only generate the downlink error correction code ECC_LINK based on the host data HOST_DATA, but does not change the host data HOST_DATA. Therefore, the data HOST_DATA input to the downlink error correction code generation circuit 111 during a write operation and the data DATA output from the downlink error correction code generation circuit 111 may be the same. The downlink error correction code ECC_LINK may be multiple bits.

The uplink error correction circuit 113 may correct an error of the data DATA transferred from the memory 150 based on the uplink error correction code ECC_LINK transferred from the memory 150 during a read operation. Correcting an error may mean detecting an error of the data DATA based on an uplink error correction code ECC_LINK and, when an error is detected, correcting the detected error. The uplink error correction circuit 113 may receive an error flag signal ERR_FALG from the memory 150. When the error flag signal ERR_FLAG is activated, it may be recognized that there is an error in the data DATA, which is provided from the memory 150, even though no error is detected in the data DATA provided from the memory 150 by an error correction operation of the uplink error correction circuit 113. That is, although no error is detected in the data DATA provided from the memory 150 during the error correction operation of the uplink error correction circuit 113, the activated error flag signal ERR_FLAG may mean that an error has occurred in the data DATA while processing the data DATA in the memory 150 before the transfer of the data DATA from the memory 150 to the memory controller 110. When an uncorrectable error is detected by the uplink error correction circuit 113, or when the error flag signal ERR_FLAG is activated, the uplink error correction circuit 113 may inform the constituent elements (not shown) using the data HOST_DATA in the memory controller 110 and the host that the data HOST_DATA provided by the uplink error correction circuit 113 is erroneous data.

The memory 150 may receive and store data DATA from the memory controller 110 during a write operation, and transfer the data DATA to the memory controller 110 during a read operation. The memory 150 may be one among diverse types of memories such as a DRAM, a High Bandwidth Memory (HBM), a Phase Change Random Access Memory (PCRAM), a flash memory and the like. The memory 150 may include a downlink error correction circuit 151, an uplink error correction code generation circuit 153, a memory error correction code generation circuit 155, a memory error correction circuit 157, an error injection circuit 159, and a memory core 161. The downlink error correction circuit 151 and the uplink error correction code generation circuit 153 may be circuits for dealing with an error occurring in the process of transferring data DATA between the memory controller 110 and the memory 150. Also, the memory error correction code generation circuit 155 and the memory error correction circuit 157 may be a circuit for dealing with an error that may occur in the process of writing data DATA' in the memory core 161 and reading the data DATA' from the memory core 161.

The downlink error correction circuit 151 may correct an error of the data DATA transferred from the memory controller 110 based on the downlink error correction code ECC_LINK transferred from the memory controller 110. Correcting the error may mean detecting an error of the data DATA and correcting the detected error, based on the downlink error correction code ECC_LINK. The downlink error correction circuit 151 may activate an uncorrectable error signal UE when an uncorrectable error is detected in the data DATA provided from the memory controller 110, When there is an error exceeding the error correction capability of the downlink error correction circuit 151, the uncorrectable error signal UE may be activated. For example, when the downlink error correction circuit 151 is capable of correcting an error of up to 1 bit but when there is an error of 2 bits or more, the uncorrectable error signal UE may be activated. When the uncorrectable error signal UE is activated, it may mean that the downlink error correction circuit 151 is not capable of correcting the error, so the data WR_DATA output from the downlink error correction circuit 151 has an error. In FIG. 1, "WR" denotes the data and the error correction code processed toward the memory core 161 in the write operation, and "RD" denotes the data and the error correction code processed toward the memory controller 110 in the read operation.

The memory error correction code generation circuit 155 may generate the memory error correction code WR_MEM_ECC based on the data WR_DATA whose error is corrected by the downlink error correction circuit 151. Since the memory error correction code generation circuit 155 only generates a memory error correction code WR_MEM_ECC based on the error corrected data WR_DATA, the data WR_DATA input to the memory error correction code generation circuit 155 and the data WR_DATA output from the memory error correction code generation circuit 155 may be the same. The memory error correction code WR_MEM_ECC may be multiple bits.

When an uncorrectable error is detected by the downlink error correction circuit 151, that is, when an uncorrectable error signal UE is activated, the error injection circuit 159 may inject an error into at least one or more among the data WR_DATA and the memory error correction codes WR_MEM_ECC and transfer them to the memory core 161. When no uncorrectable error is detected by the downlink error correction circuit 151, that is, when an uncorrectable error signal UE is deactivated, the error injection circuit 159 may transfer the input data WR_DATA and the memory error correction code WR_MEM_ECC to the memory core 161 as they are. In short, in this case, WR_DATA=WR_DATA' and WR_MEM_ECC=WR_MEM_ECC'.

The error injection circuit 159 may intentionally inject an error into at least one or more among the data WR_DATA and the memory error correction codes WR_MEM_ECC when the uncorrectable error signal UE is activated to make the memory error correction circuit 157 detect an uncorrectable error, i.e., the intentionally injected error. The following are two examples of the error injection method of the error injection circuit 159.

(1) The error injection circuit 159 may generate the data WR_DATA' of a predetermined pattern regardless of the value of the data WR_DATA For example, the error injection circuit 159 may generate the data WR_DATA' of a predetermined pattern '1111 . . . '. In this case, the memory error correction circuit 157 may detect that the data is of a predetermined pattern during a read operation and determine that there is an error in the data.

(2) The error injection circuit 159 may invert a part of at least one or more among the data WR_DATA and the memory error correction code WR_MEM_ECC and transfer it to the memory core 161. The error injection circuit 159 may inject an error in order to make the memory error correction circuit 157 detect an uncorrectable error. Thus, the error injection circuit 159 may inject errors, a number of which exceeds the error correction capability of the memory error correction circuit 157. For example, when the error correction capability of the memory error correction circuit 157 is 1 bit, the error injection circuit 159 may invert two or more bits among the data WR_DATA and the memory error correction code WR_MEM_ECC and transfer it to the memory core 161.

Other than the above-described methods (1) and (2), the error injection circuit 159 may inject an error in diverse methods to make the memory error correction circuit 157 detect an uncorrectable error in the data WR_DATA and the memory error correction code WR_MEM_ECC.

The memory core 161 may store the data WR_DATA' and the memory error correction code WR_MEM_ECC that are transferred from the error injection circuit 159. The memory core 161 may include a cell array including a plurality of memory cells and circuits for writing and reading data to and from the cell array.

The memory error correction circuit 157 may correct an error of data RD_DATA that is read from the memory core 161 based on the memory error correction code RD_MEM_ECC that is read from the memory core 161. Correcting the error may mean detecting an error of the data RD_DATA based on the memory error correction code RD_MEM_ECC and correcting the detected error. The memory error correction circuit 157 may activate the error flag signal ERR_FLAG when an uncorrectable error is detected in the data RD_DATA. When an error exceeding the error correction capability of the memory error correction circuit 157 exists, the error flag signal may be activated. When an error exceeding the error correction capability of the memory error correction circuit 157 occurs in the memory core 161, the error flag signal ERR_FLAG may be activated. Also, although no error has occurred in the memory core 161, when an error is injected in the data RD_DATA by the error injection circuit 159, the error flag signal ERR_FLAG may be activated. The error flag signal ERR_FLAG may be transferred from the memory 150 to the memory controller 110.

The uplink error correction code generation circuit 153 may generate an uplink error correction code ECC_LINK based on the data RD_DATA' output from the memory error correction circuit 157. The uplink error correction code generation circuit 153 may differ only in that it generates an uplink error correction code ECC_LINK transferred from the memory 150 to the memory controller 110 during a read operation, and it may generate the code ECC_LINK in the same manner as the downlink error correction code generation circuit 111. The uplink error correction code generation circuit 153 may generate an uplink error correction code ECC_LINK but does not process data. Therefore, the data RD_DATA' input to the uplink error correction code generation circuit 153 may be the same as the data DATA output from the uplink error correction code generation circuit 153.

Figure 2:
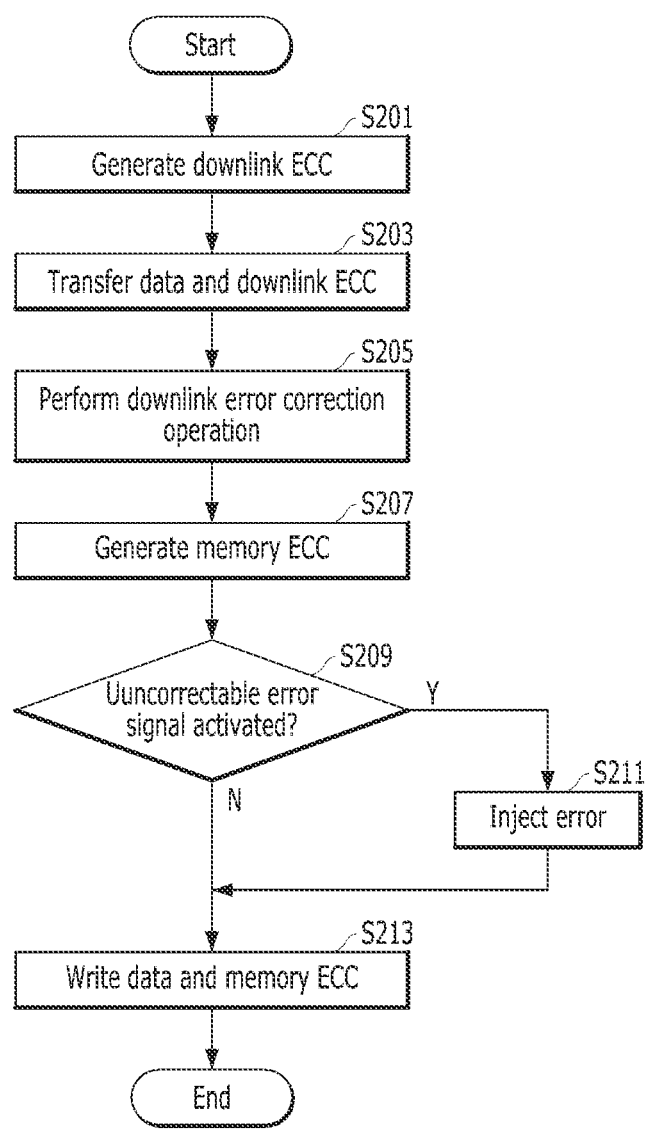
FIG. 2 is a flowchart describing a write operation of the memory system 100 shown in FIG. 1 according to an embodiment of the present invention.

FIG. 2 is a flowchart describing a write operation of the memory system 100 shown in FIG. 1 according to an embodiment of the present invention.

Referring to FIG. 2, first, the downlink error correction code generation circuit 111 of the memory controller 110 may generate a downlink error correction code ECC_LINK based on the host data HOST_DATA in operation S201.

The data DATA and the downlink error correction code ECC_LINK may be transferred from the memory controller 110 to the memory 150 in operation S203.

An error correction operation of the downlink error correction circuit 151 of the memory 150 may be performed in operation S205. The downlink error correction circuit 151 may detect an error of the data DATA based on the downlink error correction code ECC_LINK and correct the detected error. When an uncorrectable error is detected by the downlink error correction circuit 151, the uncorrectable error signal UE may be activated.

The memory error correction code generation circuit 155 of the memory 150 may generate the memory error correction code WR_MEM_ECC based on the data WR_DATA received from the downlink error correction circuit 151 in operation S207.

When an uncorrectable error signal is activated (Y in operation S209), the error injection circuit 159 may inject an error into at least one among the data WR_DATA and the memory error correction code WR_ERR_ECC in operation S211. When the uncorrectable error signal is deactivated (N in the operation S209), the error injection operation may not be performed.

Also, the data WR_DATA' and the memory error correction code WR_MEM_ECC' may be written into the memory core 161 in operation S213.

Figure 3:
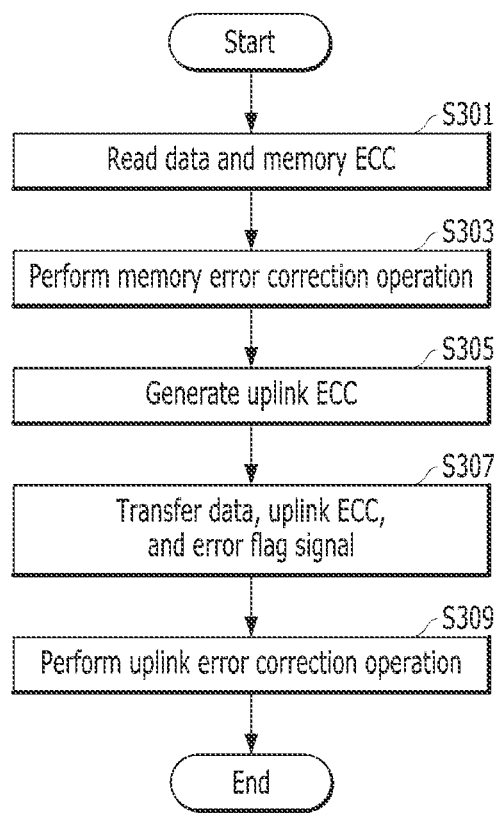
FIG. 3 is a flowchart describing a read operation of the memory system 100 shown in FIG. 1 according to an embodiment of the present invention.

FIG. 3 is a flowchart describing a read operation of the memory system 100 shown in FIG. 1 according to an embodiment of the present invention.

Referring to FIG. 3, first, the data RD_DATA and the memory error correction code RD_MEM_ECC may be read from the memory core 161 in operation S301.

An error correction operation of the memory error correction circuit 157 may be performed in operation S303. The memory error correction circuit 157 may detect an error in the data RD_DATA based on the memory error correction code RD_MEM_ECC and correct the detected error. When the memory error correction circuit 157 detects an uncorrectable error, an error flag signal ERR_FLAG may be activated.

The uplink error correction code generation circuit 153 may generate an uplink error correction code ECC_LINK based on the data RD_DATA' transferred from the memory error correction circuit 157 in operation S305.

Data DATA, an uplink error correction code ECC_LINK, and an error flag signal ERR_FLAG may be transferred from the memory 150 to the memory controller 110 in operation S307.

Now, an error correction operation of the uplink error correction circuit 113 of the memory controller 110 may be performed in operation S309. The uplink error correction circuit 113 may detect an error of the data DATA based on the uplink error correction code ECC_LINK and correct the detected error. The uplink error correction circuit 113 may recognize that there is an uncorrectable error in the received data DATA when it detects an uncorrectable error or when the error flag signal ERR_FLAG is activated.

When an uncorrectable error is detected in the downlink error correction circuit 151 of the memory 150 or when an uncorrectable error is detected in the memory error correction circuit 157 of the memory 150, the information that there is an uncorrectable error may be transferred to the memory controller 110 in the memory system 100 by using the uncorrectable error signal UE and the error flag signal ERR_FLAG. Therefore, the reliability of the memory system 100 may be improved.

According to the embodiment of the present invention, reliability of a memory system may be improved.

Moreover, the embodiments of the present disclosure have been described in the drawings and specification. Although specific terminologies are used here, those terms are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein. The embodiments may be combined to form additional embodiments.

While the present invention has been described with respect to the specific embodiments, it will be apparent to those skilled in the art that various changes and modifications may be made without departing from the spirit and scope of the invention as defined in the following claims.

What is claimed is:

1. A memory, comprising:
   a downlink error correction circuit suitable for correcting an error in data transferred from a memory controller based on a downlink error correction code transferred from the memory controller to produce an error-correction-operation-performed data;
   a memory error correction code generation circuit suitable for generating a memory error correction code based on the error-correction-operation-performed data obtained by the downlink error correction circuit;
   an error injection circuit suitable for injecting an error into at least one among the error-correction-operation-performed data obtained by the downlink error correction circuit and the memory error correction code when an uncorrected error in the data transferred from the memory controller is detected by the downlink error correction circuit;
   a memory core suitable for storing the data and the memory error correction code transferred from the error injection circuit; and
   a memory error correction circuit suitable for correcting an error of the data read from the memory core based on the memory error correction code read from the memory core, and notifying, when an uncorrectable error is detected in the data read from the memory core, the memory controller of the detection of the uncorrectable error,
   wherein an amount of the error injected by the error injection circuit is greater than the memory error correction circuit can correct.

2. The memory of claim 1, further comprising an uplink error correction code generation circuit suitable for generating an uplink error correction code based on the error-correction-operation-performed data obtained by the memory error correction circuit.

3. The memory of claim 1, wherein when the downlink error correction circuit detects the uncorrectable error in the data transferred from the memory controller, the error injection circuit injects the error by changing the error-correction-operation-performed data into a predetermined data and transfers the predetermined data to the memory core.

4. The memory of claim 1, wherein when the downlink error correction circuit detects the uncorrectable error in the data transferred from the memory controller, the error injection circuit injects the error by inverting a portion of at least one among the error-correction-operation-performed data and the memory error correction code and transfers a result of the inverting to the memory core.

5. A memory system, comprising:
   a memory controller which comprises:
   a downlink error correction code generation circuit suitable for generating a downlink error correction code based on data to be transferred to a memory; and
   the memory which comprises:
   a downlink error correction circuit suitable for correcting an error in data transferred from the memory controller based on the downlink error correction code transferred from the memory controller to produce an error-correction-operation-performed data;
   a memory error correction code generation circuit suitable for generating a memory error correction code based on the error-correction-operation-performed data obtained by the downlink error correction circuit;
   an error injection circuit suitable for injecting an error into at least one among the error-correction-operation-performed data obtained by the downlink error correction circuit and the memory error correction code when an uncorrectable error in the data transferred from the memory controller is detected by the downlink error correction circuit;
   a memory core suitable for storing the error-correction-operation-performed data and the memory error correction code transferred from the error injection circuit; and
   a memory error correction circuit suitable for correcting an error of the data read from the memory core based on the memory error correction code read from the memory core, and notifying, when an uncorrectable error is detected in the data read from the memory core, the memory controller of the detection of the uncorrectable error, wherein an amount of the error injected by the error injection circuit is greater than the memory error correction circuit can correct.

6. The memory system of claim 5, wherein the memory further comprises an uplink error correction code generation circuit suitable for:

generating an uplink error correction code based on the error-correction-operation-performed data obtained by the memory error correction circuit, and transferring the error-correction-operation-performed data obtained by the memory error correction circuit and the uplink error correction code to the memory controller, and wherein the memory controller further comprises an uplink error correction circuit suitable for correcting an error of the data transferred from the uplink error correction code generation circuit based on the uplink error correction code transferred from the uplink error correction code generation circuit.

7. The memory system of claim 5, wherein when the downlink error correction circuit detects the uncorrectable error in the data transferred from the downlink error correction code generation circuit, the error injection circuit injects the error by changing the error-correction-operation-performed data into a predetermined data and transfers the predetermined data to the memory core.

8. The memory system of claim 5, wherein when the downlink error correction circuit detects the uncorrectable error in the data transferred from the downlink error correction code generation circuit, the error injection circuit injects the error by inverting a portion of at least one among the error-correction-operation-performed data and the memory error correction code and transfers a result of the inverting to the memory core.

9. A method for operating a memory, comprising:

receiving data and a downlink error correction code;

performing a first error correction operation for correcting an error of the data based on the downlink error correction code to produce an error-correction-operation-performed data;

detecting an uncorrectable error in the data through the first error correction operation;

generating a memory error correction code based on the error corrected data;

injecting an error into at least one among the error-correction-operation-performed data and the memory error correction code in response to the detection of the uncorrectable error and transferring the data and the memory error correction code to a memory core after the injecting;

writing the data and the memory error correction code transferred to the memory core into the memory core, reading the data and the memory error correction code from the memory core;

performing a second error correction operation for correcting an error of the data read from the memory core based on the memory error correction code read from the memory core; and detecting an uncorrectable error in the data through the second error correction operation, and notifying the memory controller of the detection of the uncorrectable error wherein an amount of the error injected into at least one of the error-correction-operation-performed data and the memory error correction code is greater than the second error correction operation can correct.

10. The method of claim 9, wherein the injecting includes changing the error-correction-operation-performed data into a predetermined data in response to the detection of the uncorrectable error.

11. The method of claim 9, wherein the injecting includes inverting at least a portion of at least one among the error-correction-operation-performed data and the memory error correction code in response to the detection of the uncorrectable error.

12. An operating method of a memory system, the operating method comprising:

generating a first error-correction code based on first data;

performing a first error-correction operation on the first data, which experiences a medium, based on the first error-correction code to generate second data;

generating a second error-correction code based on the second data;

injecting, when the second data includes an original error that is not corrected through the first error-correction operation, an intentional error into at least one of the second data and the second error-correction code;

storing, into a memory core, the second data and the second error-correction code; and identifying the original error by detecting the intentional error through a second error-correction operation, which is performed on the second data based on the second error-correction code read out from the memory core together with the second data, wherein an amount of the intentional error is greater than the second error-correction operation can correct.

* * * * *